United States Patent [19]

Marquardt et al.

[11] 4,252,931
[45] Feb. 24, 1981

[54] POLYMERS CONTAINING PRIMARY ALIPHATIC CARBONAMIDE GROUPS AND/OR N-METHYLOL DERIVATIVES OF THE CARBONAMIDE GROUPS

[75] Inventors: Klaus Marquardt, Burghausen; Günther Staudinger, Munich, both of Fed. Rep. of Germany

[73] Assignee: Consortium für Elektrochemische Industrie GmbH, Munich, Fed. Rep. of Germany

[21] Appl. No.: 66,206

[22] Filed: Aug. 13, 1979

[30] Foreign Application Priority Data

Aug. 9, 1978 [DE] Fed. Rep. of Germany ....... 2834777

[51] Int. Cl.$^3$ ............................................. C08F 22/38
[52] U.S. Cl. ................... 526/264; 526/265; 526/271; 526/303; 526/304
[58] Field of Search ............... 526/304, 264, 265, 271, 526/303

[56] References Cited

U.S. PATENT DOCUMENTS 2,486,370  10/1949  Kenyon et al. ...................... 526/304

*Primary Examiner*—Harry Wong, Jr.

*Attorney, Agent, or Firm*—Allison C. Collard; Thomas M. Galgano

[57] ABSTRACT

Copolymers according to the invention contain a new crosslinking system based on carbonamide and/or N-methylol carbonamide groups in the copolymer, the crosslinked polymers containing the following structural units

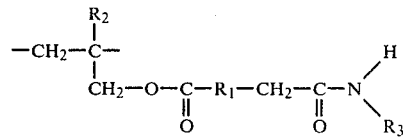

in which R represents a straight-chain or branched aliphatic hydrocarbon radical having 0 to 9 carbon atoms, R represents a hydrogen atom or a methyl radical, and R represents hydrogen or a —CH$_2$OH— group and have molecular weights of between $10^3$ and $10^6$.

The invention also relates to a process of making the copolymers, which have among other advantages a superior resistance to solvents. They are useful as coating compositions and the like.

11 Claims, No Drawings

POLYMERS CONTAINING PRIMARY ALIPHATIC CARBONAMIDE GROUPS AND/OR N-METHYLOL DERIVATIVES OF THE CARBONAMIDE GROUPS

The invention relates to new polymers, their manufacture and use.

The purpose of the invention is to provide polymers having advantageous crosslinking systems.

The object of the invention is to produce polymers that have the reactivity of primary aliphatic carbonamides and/or of primary aliphatic N-methylol carbonamides and that furthermore may contain other reactive groups.

The subject of the invention are copolymers consisting of monomer units obtained by the radical polymerization of at least one monomer selected from the group consisting of olefins, such as ethylene, propylene, acrylic acid, methacrylic acid and esters thereof with alkyl radicals having up to 8 carbon atoms, amides or nitriles thereof, styrene and substituted styrenes, vinyl esters of alkylcarboxylic acids having 8 to 18 carbon atoms, especially vinyl acetate, vinyl halides, especially vinyl chloride, N-vinylpyrrolidone, N-vinylpyridine, crotonic acid and derivatives thereof, such as esters or amides, vinylidene chloride, maleic, fumaric and itaconic acid and derivatives thereof, such as, for example, anhydrides, semi-esters, esters, semi-amides, amides, salts, vinyl ethers and vinyl ketones, which are characterized in that they contain structural units of the general formula I

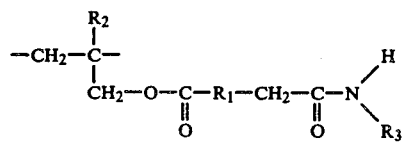

in which
$R_1$ represents a straight-chain or branched aliphatic hydrocarbon radical having 0 to 9 carbon atoms,
$R_2$ represents hydrogen or a methyl radical, and
$R_3$ represents hydrogen or a —CH$_2$OH— group,
and have molecular weights of between $10^3$ and $10^6$, preferably between $10^4$ and $10^5$. The units characterized by the general formula I are contained in the polymers in quantities between 1 and 50% by weight, preferably between 5 and 20% by weight.

A further object of the invention is to provide a process for the manufacture of polymers of the above-noted types by radical polymerization according to the known techniques of bulk-, solution-, precipitation- or dispersion polymerization, at temperatures between 0° and 150° C., which is characterized in that compounds of the general formula II

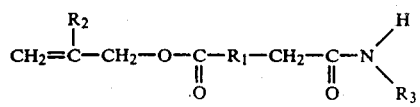

in which
$R_1$ represents a straight-chain or branched aliphatic hydrocarbon radical having 0 to 9 carbon atoms,
$R_2$ represents hydrogen or a methyl radical, and
$R_3$ represents hydrogen or a —CH$_2$OH— group, are copolymerized with at least one other olefinically unsaturated monomer.

The copolymers according to the invention are suitable for use as coating composition, lacquers, adhesives and sealants and can be used in textile finishing and for the manufacture of shaped articles.

When $R_3$ is present, for example, in the form of a methylol group, the copolymers according to the invention may be crosslinked by adding strong acids, such as, for example, p-toluenesulphonic acid, and/or by heating, optionally under pressure, in the manner known for polymers containing N-methylol groups. Crosslinking may alternatively, however, be effected by adding formaldehyde/melamine condensation products, such as, for example, hexamethoxymethylmelamine, or a formaldehyde urea condensation product, such as, for example, dimethylolurea, under the conditions mentioned for the N-methylol compounds. The crosslinked copolymers are distinguished by a high degree of crosslinking and excellent resistance to solvents.

Examples of unsaturated compounds of the general formula II are the allyl and methallyl esters of malonamic acid, succinamic acid, glutaramic acid, adipamic acid, pimelamic acid, suberamic acid, sebacamic acid or dodecanamic acid, and their N-methylol derivatives, such as, for example, N-methyloladipamic acid allyl esters.

The compounds of the general formula II can be produced by preparing the acid chloride, for example, from the monoallyl- or monomethallyl esters of the corresponding dicarboxylic acids by means of thionyl chloride, and subsequently preparing the carboxylic acid amide with excess ammonia. It is, however, also possible to convert cyclic dicarboxylic acid imides with allyl alcohol and a suitable catalyst, such as, for example, Ca(OH)$_2$, directly into the corresponding carbonamic acid allyl esters. The carbonamic acid allyl esters may then be reacted with formaldehyde and a suitable catalyst base to form the methylol compound.

Polymers in which the group $R_3$ is a methylol group may alternatively be produced by polymerizing compounds of the general formula II, in which $R_3$ represents hydrogen, together with other olefinically unsaturated monomers and then reacting the polymer with formaldehyde in a suitable solvent to form the methylol compound.

The copolymers according to the invention may be built up from any polymerizable monomer units. Suitable olefinically unsaturated comonomers are, for example, monomers selected from the group consisting of olefins, such as ethylene, propylene, acrylic acid, methacrylic acid and esters thereof with alkyl radicals having up to 8 carbon atoms, amides or nitriles thereof, styrene and substituted styrenes, vinyl esters of alkylcarboxylic acids having 1 to 18 carbon atoms, especially vinyl acetate, vinyl halides, especially vinyl chloride, N-vinylpyrrolidone, N-vinylpyridine crotonic acid and derivatives thereof, such as esters or amides, vinylidene chloride, maleic, fumaric and itaconic acid and derivatives thereof, such as, for example, anhydrides, semi-esters, esters, semi-amides, amides, salts, vinyl ethers and vinyl ketones.

For the manufacture of the polymers, the proportion of the compounds according to formula II can vary between 1 and 50% by weight. Preferably the compounds are used in quantities between 5 and 20% by weight. The polymerization is initiated either thermally or with customary radical initiators. Suitable initiators are, for example, hydrogen peroxide, inorganic peroxides or organic hydroperoxides and peroxides, aliphatic azo compounds that decompose to form radicals, redox catalyst systems, such as systems with persulphate and ascorbic acid, sodium hydrogen sulphite or iron-II salts.

The initiators are generally used in a quantity of 0.05 to 5% by weight, calculated on the quantity of monomers. The optimal quantity and the optimally active initiator may easily be ascertained by tests.

The polymerization can be carried out in bulk, but it is also possible to operate in the presence of solvents or diluents. Suitable for this purpose are, for example, esters, alcohols, ketones, ethers, aliphatic, cycloaliphatic or aromatic hydrocarbons, as well as formamide and dimethylformamide. Water is used as diluent especially advantageously. Also the customary processes of suspension, solution and emulsion polymerization are suitable for the polymers according to the invention. As regards the polymerization auxiliaries to be used if necessary, such as buffers, dispersants, protective colloids, emulsifiers and regulators, the process of polymerization according to the invention is in no way limited as compared with customary processes.

The polymerization can be carried out within a broad temperature range, that is approximately 0° to 150° C., preferably 40° to 120° C. The process is usually carried out at atmospheric pressure but lower or higher pressures, for example, in the case of gaseous monomers, up to 3,000 bar, may be applied.

The copolymers according to the invention are used as hardenable coating compositions, lacquers or adhesives, as solvent-resistant binders for textile products, for the manufacture of sealants or for the manufacture of shaped articles.

In the following, a number of examples are given which serve to illustrate the invention in further detail, but which are not given by way of limitation.

EXAMPLE 1

136.2 g of vinyl acetate, 13.8 g of succinamic acid allyl ester and 150.0 g of ethyl acetate were mixed in a 1 liter round-bottomed flask fitted with a blade stirrer and reflux condenser, and polymerized at 72° to 75° C. with the addition of 0.5 g of tert.-butyl perpivalate. After 3 hours, the solids content of the solutions was 50% and thus the reaction was complete.

A portion of this polymer solution was spread on a Teflon plate to form a film 0.8 mm thick when wet, and, after the ethyl acetate had evaporated, an expansible tough polymer film was obtained which could be redissolved in ethyl acetate. The K-value (according to Fikentscher, *Zellulose Chemie* 13 (1932) 58) of this material, measured in a mixture of 95% tetrahydrofuran and 5% water at 25° C., was 39.9.

2.5 g of hexamethoxymethylmelamine (Cymel 300, Cyanamid International Corp.) were added to a further portion of 50 g of the polymer solution and this was worked into a film as described, and tempered at 150° C. for 15 minutes. After this treatment, the film was resistant to ethyl acetate and extraction in boiling ethyl acetate for 6 hours yielded only 9% of solubles.

EXAMPLE 2

210 g of distilled water, 2.0 g of hydroxyethylcellulose (Nastrosol 250 GR, Hercules GmbH), 4.2 g of nonylphenolpolyglycol ether Arkopal N 100, 4.2 g of nonylphenolpolyglycol ether Arkopal N 230 (both of Hoechst AG.), 0.2 g of sodium dodecylbenzenesulphonate, 0.5 g of vinyl sulphonate and 7 mg of $(NH_4)_2Fe(SO_4)_2 \cdot 6H_2O$ were place in a 2-liter round-bottomed flask fitted with an anchor stirrer, and the mixture was adjusted to a pH of 3.5. Subsequently, 45 g of vinyl acetate and 5 g of adipamic acid allyl ester, as well as 2.5 ml of each of a 5% aqueous solution of ammonium persulphate and a 2.5% aqueous solution of Rongalite, were added, and the whole was rinsed with nitrogen and heated to 50° C. while stirring. After the initial reaction had subsided, a further 180 g of vinyl acetate in admixture with 20 g of adipamic acid allyl ester were added uniformly over a period of 2 hours. At the same time, ammonium persulphate solution and Rongalite solution were added at a rate of 5 ml/h for 2.5 hours. 3 hours after the metering-in had begun, the resulting polymer dispersion had reached a solids content of 49%. The dispersion had a viscosity of 341 mPas (Brookfield LTV viscometer, spindle No. 1, 6 rev/min).

25 g of this dispersion were mixed with 0.625 g of hexamethoxymethylmelamine (dissolved first in some water and isopropanol), and the mixture was cast to form a film 0.8 mm thick when wet. After drying, a tough colorless polymer film was obtained, which was tempered for 30 minutes at 100° C. and subsequently contained only 4% of portions soluble in boiling ethyl acetate.

EXAMPLE 3

250 g of distilled water and 10 g of a 30% aqueous solution of Mersolate (Trademark) K30 were heated to 90° C. in a 2-liter round-bottomed flask fitted with an anchor stirrer and a reflux condenser, rinsed with nitrogen and, while stirring at a pH of 3.5, a mixture of 410 g of water, 5 g of 30% aqueous Mersolate K30 solution, 4 g of $K_2S_2O_8$, 6.8 g of acrylic acid, 371 g of methyl methacrylate, 262 g of butyl acrylate and 55.5 g of adipamic acid allyl ester was uniformly added over the course of 3 hours. The pH was then adjusted to 8 with ammonia, and the mixture was stirred at 90° C. for a further hour. A finely particulate polymer dispersion having a solids content of 50.4% was obatined. The K-value of the copolymer, measured as in Example 1, was 95.

Hexamethoxymethylmelamine was added to 25 g of this dispersion as in Example 2, and the mixture was tempered for 15 minutes at 150° C. The polymer film crosslinked in this manner had only 4% of parts soluble in boiling ethyl acetate.

EXAMPLE 4

106 g of water, 30 g of a 30% aqueous solution of Aerosol A 102 (American Cyanamid Comp.) and 15 g of methanol were placed in a 2-liter round-bottomed flask with an anchor stirrer, and heated to 45° C. Then, while stirring (190 rev/min) at a pH of 3.5, an emulsion consisting of 333 g of water, 1.2 g of $NaHCO_3$, 30 g of 30% aqueous Aerosol A 102 solution, 15 g of methanol, 6 g of acrylic acid, 360 g of vinyl acetate, 120 g of vinyl laurate, 120 g of butyl acrylate and 24 g of N-methyloladipamic acid allyl ester were added uniformly over the course of 3 hours. The initiator used was 6 g of ammonium persulphate and 3 g of Rongalite, which, each dissolved in 30 ml of water, were simultaneously metered in with the monomer emulsion. The resulting polymer dispersion had a solids content of 51% and a viscosity of 2100 mPas (Brookfield LTV viscometer, spindle No. 2, 6 rev/min) and was suitable as a binder for non-woven textiles.

The K-value of the copolymer, measured as in Example 1, was 71.

A sample of the dispersion was spread to form a film 0.8 mm thick when wet, and dried to a soft expansible colorless film. This film was heated at 150° C. for 5 minutes and was then only 7.5% soluble in boiling ethyl acetate.

COMPARISON EXAMPLE

Example 4 was repeated except that, instead of the N-methyloladipamic acid allyl ester, the same quantity by weight of N-methylolacrylamide was used. A copolymer dispersion with secondary N-methylolcarbonamide groups was obtained. A polymer film tempered as in Example 4, however, was still 17% soluble in boiling ethyl acetate, although, as a result of the different molecular weights of the N-methylol compounds, approximately double the molar amount of N-methylolcarbonamide groups was present in this copolymer.

What is claimed is:

1. A copolymer consisting essentially of polymeric units obtained by the radical polymerization of at least one monomer selected from the group consisting of olefins, acrylic acid, methacrylic acid and esters thereof with alkyl radicals having up to 8 carbon atoms, amides or nitriles thereof, styrene and substituted styrenes, vinyl esters of alkyl carboxylic acids having 1 to 18 carbon atoms, vinyl halides, N-vinylpyrrolidone, N-vinylpyridine, crotonic acid and esters or amides thereof, vinylidene chloride, maleic, fumaric and itaconic acid and anhydrides, monoesters, di-esters, monoamides, di-amides and salts thereof, vinyl ethers and vinyl ketones, with an allyl ester of the general formula I

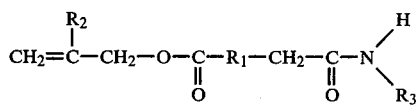

in which $R_1$ represents a straight-chain or branched aliphatic hydrocarbon radical having 0 to 9 carbon atoms, $R_2$ represents a hydrogen atom or a methyl radical, and $R_3$ represents hydrogen or a —$CH_2OH$— group, and have molecular weights of between $10^3$ and $10^6$.

2. A copolymer according to claim 1, wherein said molecular weights are between $10^4$ and $10^5$.

3. A copolymer according to claim 1, wherein at least one compound of formula I is polymerized in quantities of between 1 and 50% by weight.

4. A copolymer according to claim 3, wherein the quantities of compounds of formula I are between 5 and 20% by weight.

5. A process for the manufacture of the copolymer of claim 1, wherein said radical polymerization was performed by bulk, solution, precipitation or dispersion polymerization, at temperatures between 0° and 150° C.

6. A coating composition made from a copolymer as defined in claims 1, 2 or 3.

7. A lacquer made from a copolymer as defined in claims 1, 2 or 3.

8. An adhesive made from a copolymer as defined in claims 1, 2 or 3.

9. A sealant made from a copolymer as defined in claims 1, 2 or 3.

10. A textile finishing agent made from a copolymer as defined in claims 1, 2 or 3.

11. A molded article made from a copolymer as defined in claims 1, 2 or 3.

* * * * *